United States Patent [19]
Gould et al.

[11] Patent Number: 6,088,671
[45] Date of Patent: Jul. 11, 2000

[54] CONTINUOUS SPEECH RECOGNITION OF TEXT AND COMMANDS

[75] Inventors: Joel M. Gould, Winchester; Jonathan H. Young, Cambridge, both of Mass.

[73] Assignee: Dragon Systems, Newton, Mass.

[21] Appl. No.: 09/098,502

[22] Filed: Jun. 17, 1998

Related U.S. Application Data

[62] Division of application No. 08/559,207, Nov. 13, 1995, Pat. No. 5,799,279.

[51] Int. Cl.[7] .............................. G10L 13/08; G10L 15/26
[52] U.S. Cl. .......................... 704/235; 704/258; 704/259; 704/277; 704/260; 704/275
[58] Field of Search ...................................... 704/260, 275, 704/277, 235, 258, 259

[56] References Cited

U.S. PATENT DOCUMENTS

| | | |
|---|---|---|
| 4,376,874 | 3/1983 | Karban et al. . |
| 4,570,746 | 2/1986 | Das et al. . |
| 4,618,984 | 10/1986 | Das et al. . |
| 4,624,008 | 11/1986 | Vensko et al. . |
| 4,677,569 | 6/1987 | Nakano et al. . |
| 4,688,195 | 8/1987 | Thompson et al. . |
| 4,776,016 | 10/1988 | Hansen . |
| 4,783,803 | 11/1988 | Baker et al. . |
| 4,805,218 | 2/1989 | Bamberg et al. . |
| 4,805,219 | 2/1989 | Baker et al. . |
| 4,827,520 | 5/1989 | Zeinstra . |
| 4,829,576 | 5/1989 | Porter . |
| 4,833,712 | 5/1989 | Bahl et al. . |
| 4,866,778 | 9/1989 | Baker . |
| 4,914,704 | 4/1990 | Cole et al. . |
| 4,931,950 | 6/1990 | Isle et al. . |
| 4,962,535 | 10/1990 | Kimura et al. . |
| 4,977,599 | 12/1990 | Bahl et al. . |
| 4,980,918 | 12/1990 | Bahl et al. . |
| 4,984,177 | 1/1991 | Rondel et al. . |
| 5,027,406 | 6/1991 | Roberts et al. . |
| 5,031,217 | 7/1991 | Nishimura . |
| 5,033,087 | 7/1991 | Bahl et al. . |
| 5,036,538 | 7/1991 | Oken et al. . |
| 5,086,472 | 2/1992 | Yoshida . |
| 5,095,508 | 3/1992 | Fujimoto . |
| 5,127,055 | 6/1992 | Larkey . |
| 5,202,952 | 4/1993 | Gillick et al. . |
| 5,231,670 | 7/1993 | Goldhor et al. . |
| 5,377,303 | 12/1994 | Firman . |
| 5,384,892 | 1/1995 | Strong . |
| 5,386,494 | 1/1995 | White . |
| 5,425,129 | 6/1995 | Garman et al. . |
| 5,428,707 | 6/1995 | Gould et al. . |
| 5,526,463 | 6/1996 | Gillick et al. . |
| 5,632,002 | 5/1997 | Hashimoto et al. . |
| 5,754,972 | 5/1998 | Baker et al. . |
| 5,765,132 | 6/1998 | Roberts . |
| 5,799,279 | 8/1998 | Gould et al. . |

OTHER PUBLICATIONS

Copy of European Search Report dated Jun. 23, 1998.

Bellisario, A. O. et al., "Commercializing Speech Recognition: Providing the Missing Link," Proc. of the 5th Int'l Conf. on Signal Processing Applications & Technology, Dallas, TX, Oct. 18–31, 1994, abstract.

Evans, Dale, "Talking to the Bug," Microcad News (Mar. 1989), pp. 58–60.

Gopalakrishnan, P.S. et al., "Immediate Recognition of Embedded Command Words," Eurospeech 91, 2nd Eur. Conf. on Speech Communications & Technology Proceedings, Genova, Italy, Sep. 24–26, 1991, abstract.

Mandel, Mark A. et al., "A Commercial Large–Vocabulary Discrete Speech Recognition System: DragonDictate," Language and Speech, vol. 35 (1,2) (1992), pp. 237–246.

*Primary Examiner*—David R. Hudspeth
*Assistant Examiner*—Vijay B Chawan
*Attorney, Agent, or Firm*—Fish & Richardson, PC

[57] ABSTRACT

In a method for use in recognizing continuous speech, signals are accepted corresponding to interspersed speech elements including text elements corresponding to text to be recognized and command elements corresponding to commands to be executed. The elements are recognized. The recognized elements are acted on in a manner which depends on whether they represent text or commands.

15 Claims, 20 Drawing Sheets

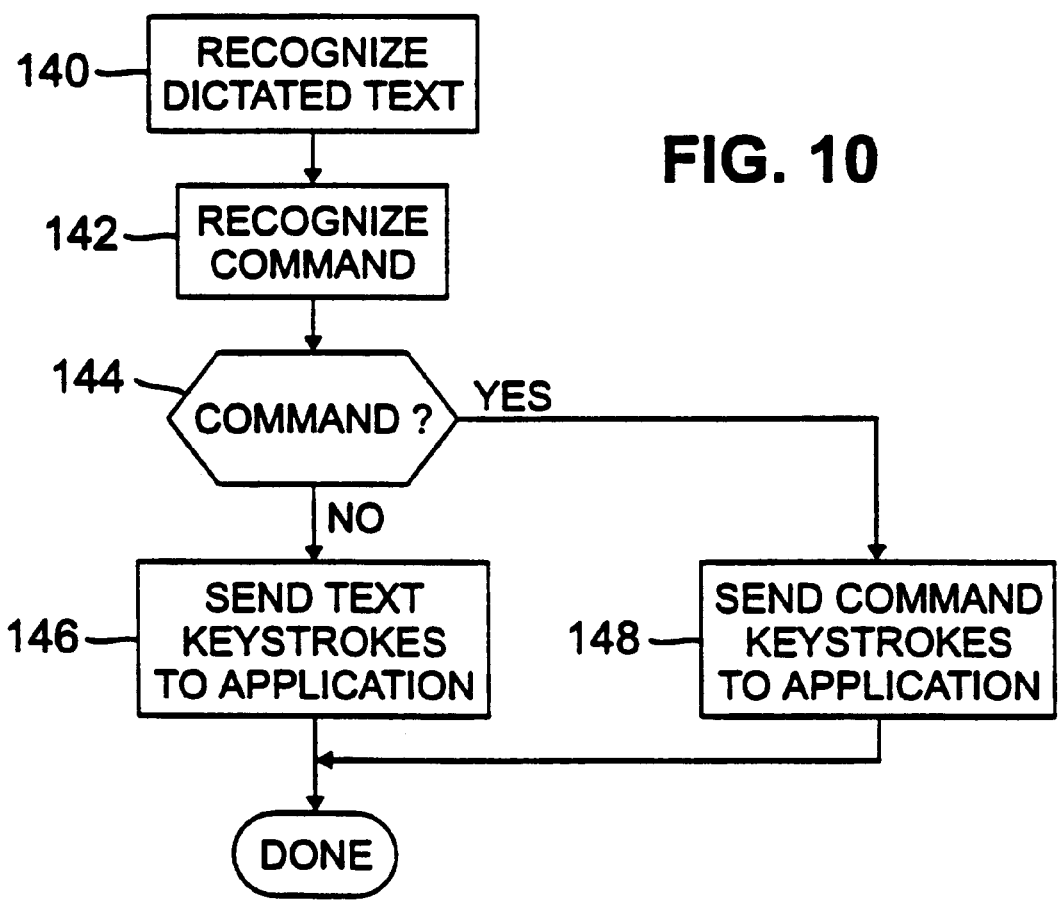

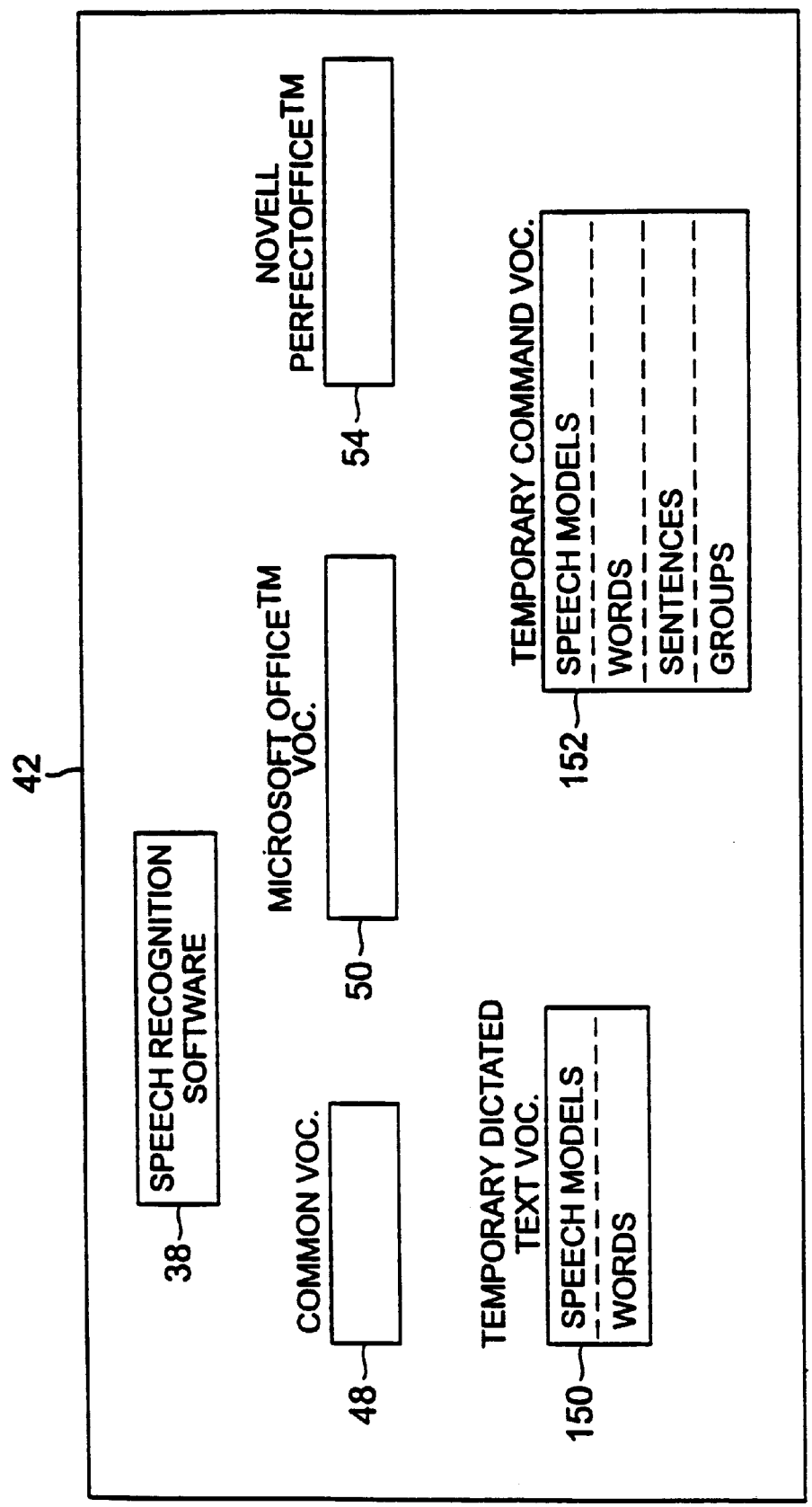

CONTINUOUS SPEECH RECOGNITION OF TEXT AND COMMANDS

This application is a divisional of U.S. application Ser. No. 08/559,207, filed Nov. 13, 1995, now U.S. Pat. No. 5,799,279, issued on Aug. 25, 1998 issued on Aug. 25, 1998.

BACKGROUND

This invention relates to continuous speech recognition.

Many speech recognition systems recognize spoken text in one mode and spoken commands in another mode. In one example, the dictation mode requires discrete speech while the command mode may be handled by continuous/discrete speech. In dictation mode, a user's discrete speech is recognized as, e.g., English words, and the recognized words are displayed to the user. The user may dictate any word that is within a vocabulary held in the system without having to follow any particular structure. This is called "free context" discrete speech. In command mode, the system recognizes either continuous or discrete speech and executes the commands. For example, if the user says "underline last three words," the system recognizes the command and then underlines the last three words that the user spoke in dictation mode. The user speaks commands as structured speech in accordance with a particular structure or template. For example, the user may say "underline last three words" but not "underline the last three words" or "please underline last three words." The user switches between command mode and dictation mode by speaking "Command Mode", double clicking on an icon representing the mode the user wants to switch into, or typing a switch mode command.

SUMMARY

In general, in one aspect, the invention features a method for use in recognizing continuous speech. Signals are accepted corresponding to interspersed speech elements including text elements corresponding to text to be recognized and command elements corresponding to commands to be executed. The elements are recognized. The recognized elements are acted on in a manner which depends on whether they represent text or commands.

Implementations of the invention may include one or more of the following. The text may be acted on by providing it to a text processing application. The commands may be acted upon by causing an application to perform a step. The recognizing may be based on natural characteristics of spoken text versus spoken commands. The recognizing may include evaluating the likelihood that a given element is either a command element or a text element. The recognizing may be biased in favor of a given element being text or a command. The biasing may include determining if a given one of the elements reflects a command reject or conforms to a command template; or comparing recognition scores of the given element as a command or as text; or determining the length of silence between successive ones of the elements or whether the actions of the user imply that a given one of the elements cannot be text.

The recognizing may include, in parallel, recognizing the elements as if they were text, and recognizing the elements as if they were commands. The recognizing of elements as if they were text (or commands) may be temporarily stopped upon determining that an element is a command element (or a text element). The results of the recognition may be displayed to a user. The results may be partial results. The user may be enabled to cause a rerecognition if the element is incorrectly recognized as text or a command. The user may cause a re-recognition if a command element is recognized as a text element, and in response to the re-recognition a text processing application may undo the inclusion of the text element in text being processed. Prior to acting on a recognized command element, information associated with the command element may be displayed to a user; a direction may be accepted from the user to consider previous or subsequent elements as either text or commands but not both.

The advantages of the invention may include one or more of the following. Recognizing spoken commands within dictated text allows users to intermittently execute commands that affect the text (e.g., underlining or bolding particular words) without requiring the user to switch between separate command and dictation modes. Moreover, user confusion is reduced because the user is not required to remember which mode the system is in.

Other advantages and features will become apparent from the following description and from the claims.

DESCRIPTION

FIGS. 8a, 8b, 9a, and 9b are computer screen displays of partial results and command execution results.

FIG. 10 is a another flow chart of recognizing both commands and dictated text.

FIG. 11 is a block diagram of speech recognition software and vocabularies stored in memory.

Figure 12:
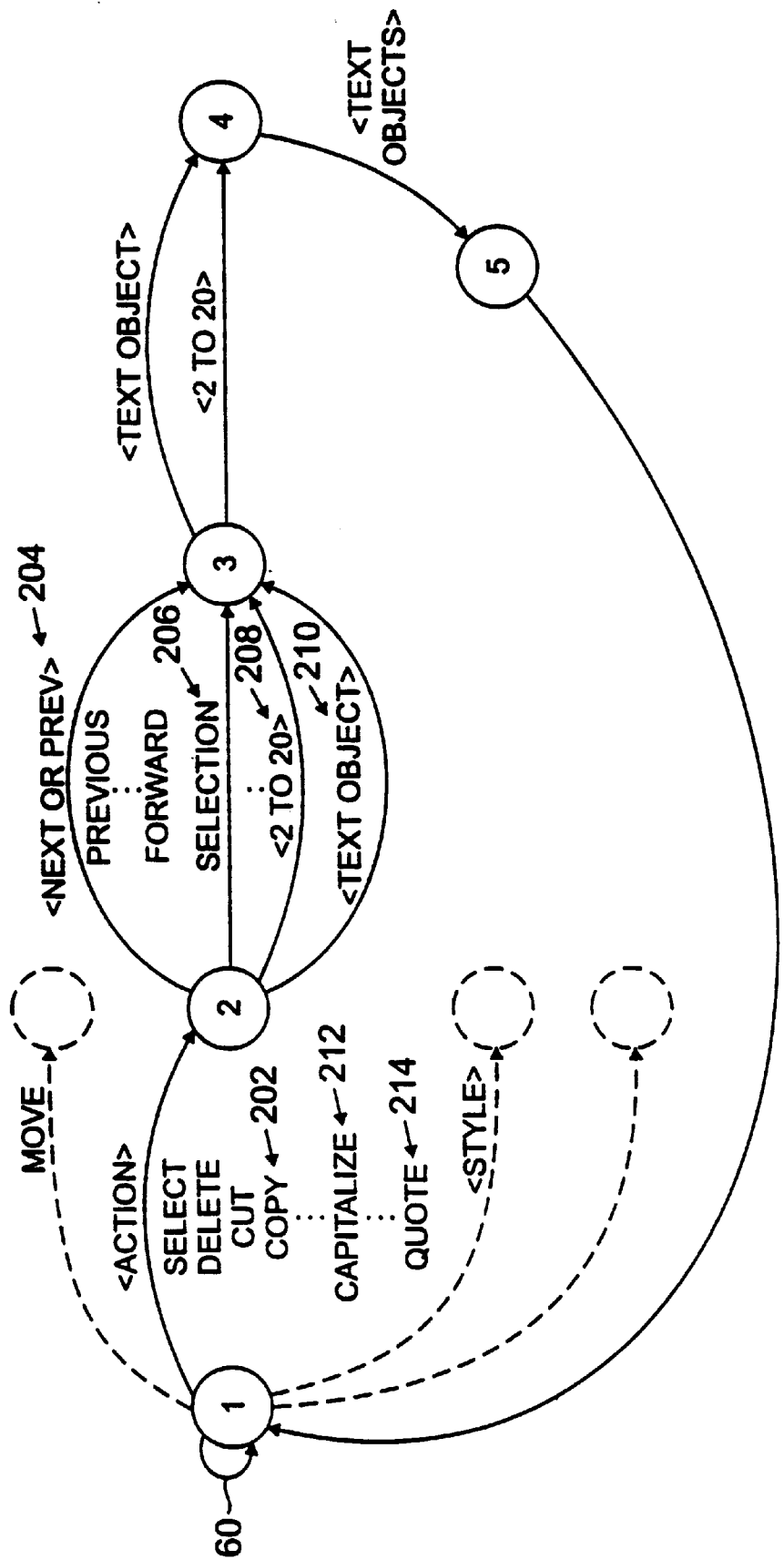

FIG. 12 is a flow chart of structured continuous command speech recognition.

Figure 13:
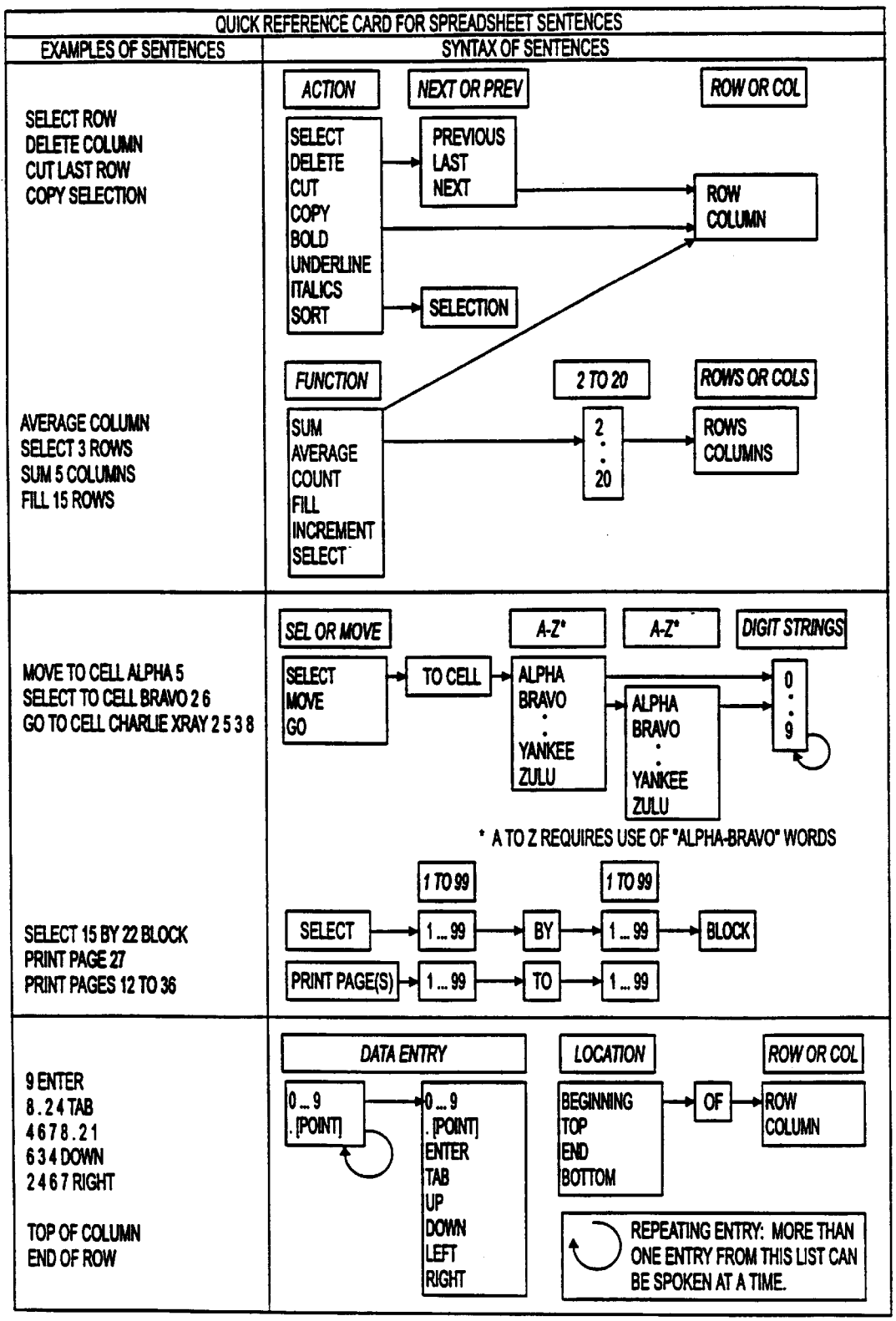

FIG. 13 is a block diagram of spreadsheet commands.

Figure 14:
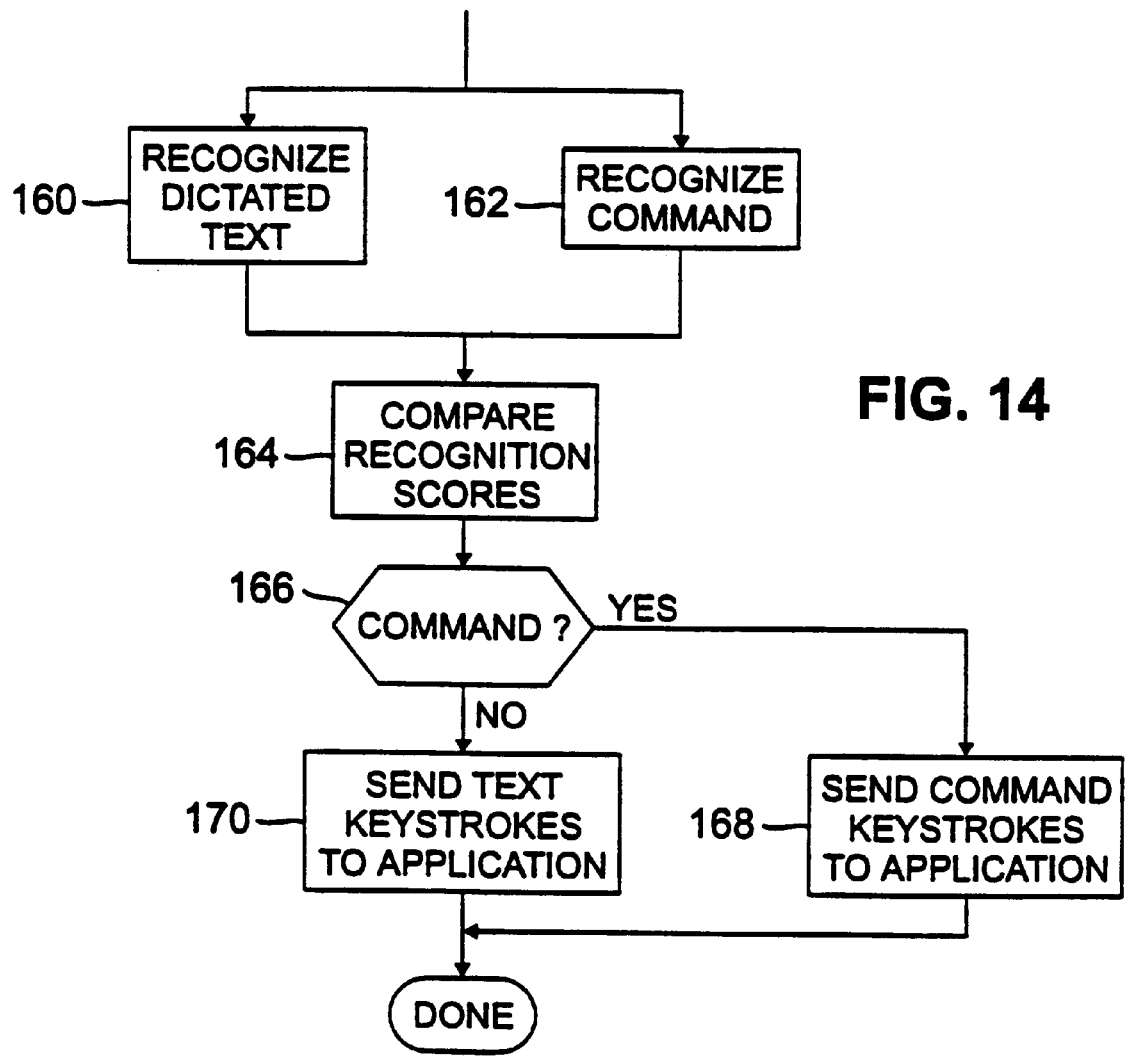

FIG. 14 is another flow chart of recognizing both commands and dictated text.

FIGS. 15a–15d are computer screen displays depicting the process of correcting a misrecognized command.

The system recognizes both continuously spoken commands and continuously dictated text by taking advantage of characteristics common to the natural speech of most users. For instance, users typically pause (e.g., 0.5 sec) before and after speaking a command. Similarly, following a pause, users begin commands by speaking action verbs (e.g., underline, bold, delete) and begin dictated text by speaking nouns. To take advantage of these and other characteristics, the system expects the user to pause before and after speaking a command and to follow a particular structure or template when speaking a command (e.g., all commands begin with action verbs). These requirements improve the accuracy with which the system distinguishes between dictated text and commands.

Figure 1:
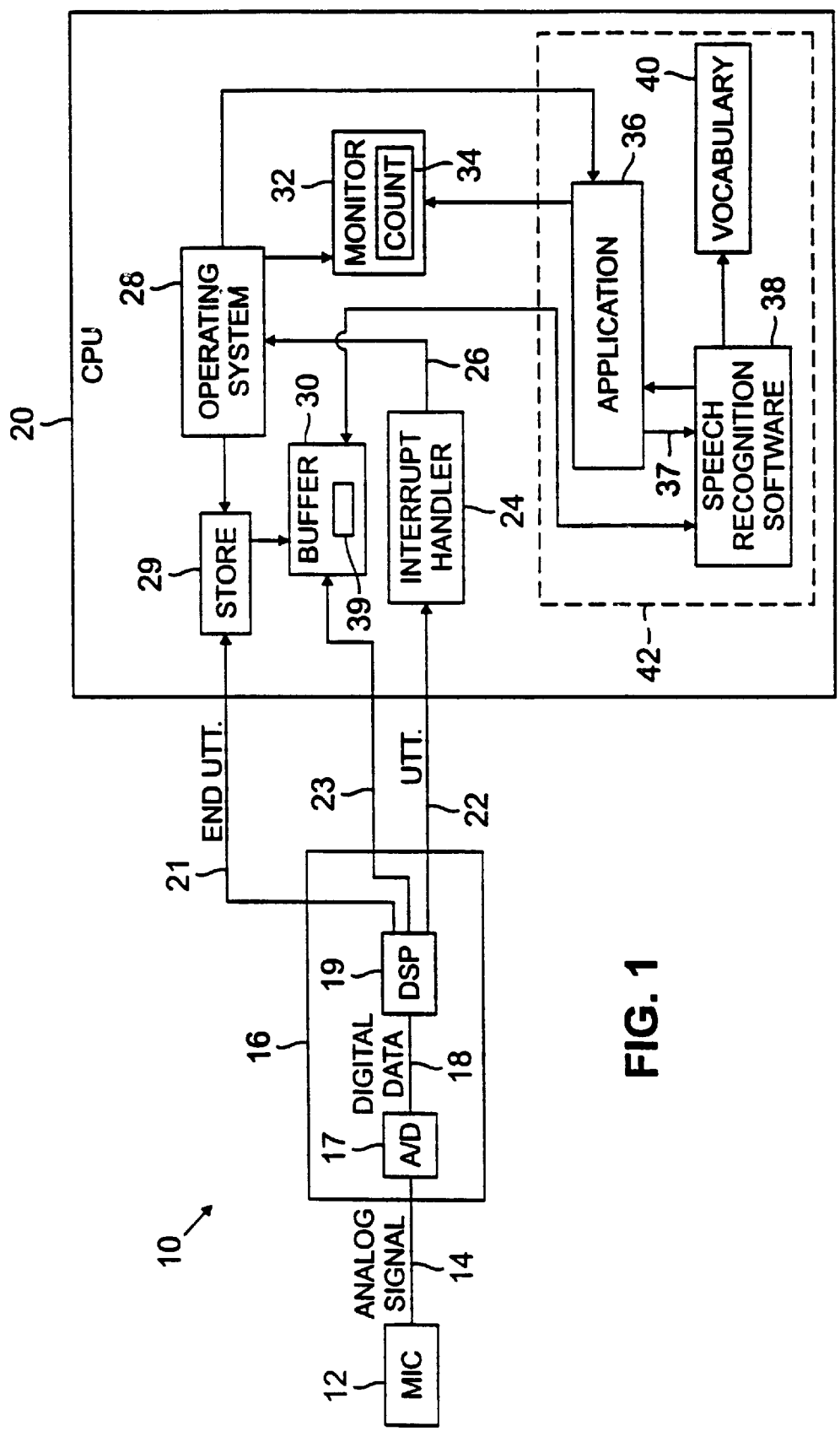
FIG. 1 is a block diagram of a speech recognition system.

Referring to FIG. 1, a typical speech recognition system 10 includes a microphone 12 for converting a user's speech into an analog data signal 14 and a sound card 16. The sound card includes a digital signal processor (DSP) 19 and an analog-to-digital (A/D) converter 17 for converting the analog data signal into a digital data signal 18 by sampling the analog data signal at about 11 Khz to generate 220 digital samples during a 20 msec time period. Each 20 ms time period corresponds to a separate speech frame. The DSP processes the samples corresponding to each speech frame to generate a group of parameters associated with the analog data signal during the 20 ms period. Generally, the parameters represent the amplitude of the speech at each of a set of frequency bands.

The DSP also monitors the volume of the speech frames to detect user utterances. If the volume of three consecutive speech frames within a window of five consecutive speech frames exceeds a predetermined speech threshold, for example, 20 dB, then the DSP determines that the analog signal represents speech and the DSP begins sending a batch of, e.g., three, speech frames of data at a time via a digital data signal 23 to a central processing unit (CPU) 20. The DSP asserts an utterance signal (Utt) 22 to notify the CPU each time a batch of speech frames representing an utterance is sent via the digital data signal.

When an interrupt handler 24 on the CPU receives assertions of Utt signal 22, the CPU's normal sequence of execution is interrupted. Interrupt signal 26 causes operating system software 28 to call a store routine 29. Store routine 29 stores the incoming batch of speech frames into a buffer 30. When fourteen consecutive speech frames within a window of nineteen consecutive speech frames fall below a predetermined silence threshold, e.g., 6 dB, then the DSP stops sending speech frames to the CPU and asserts an End_Utt signal 21. The End_Utt signal causes the store routine to organize the batches of previously stored speech frames into a speech packet 39 corresponding to the user utterance.

Interrupt signal 26 also causes the operating system software to call monitor software 32. Monitor software 32 keeps a count 34 of the number of speech packets stored but not yet processed. An application 36, for example, a word processor, being executed by the CPU periodically checks for user input by examining the monitor software's count. If the count is zero, then there is no user input. If the count is not zero, then the application calls speech recognizer software 38 and passes a pointer 37 to the address location of the speech packet in buffer 30. The speech recognizer may be called directly by the application or may be called on behalf of the application by a separate program, such as Dragon-Dictate™ from Dragon Systems™ of West Newton, Mass., in response to the application's request for input from the mouse or keyboard.

For a more detailed description of how user utterances are received and stored within a speech recognition system, see U.S. Pat. No. 5,027,406, entitled "Method for Interactive Speech Recognition and Training" which is incorporated by reference.

Figure 2:
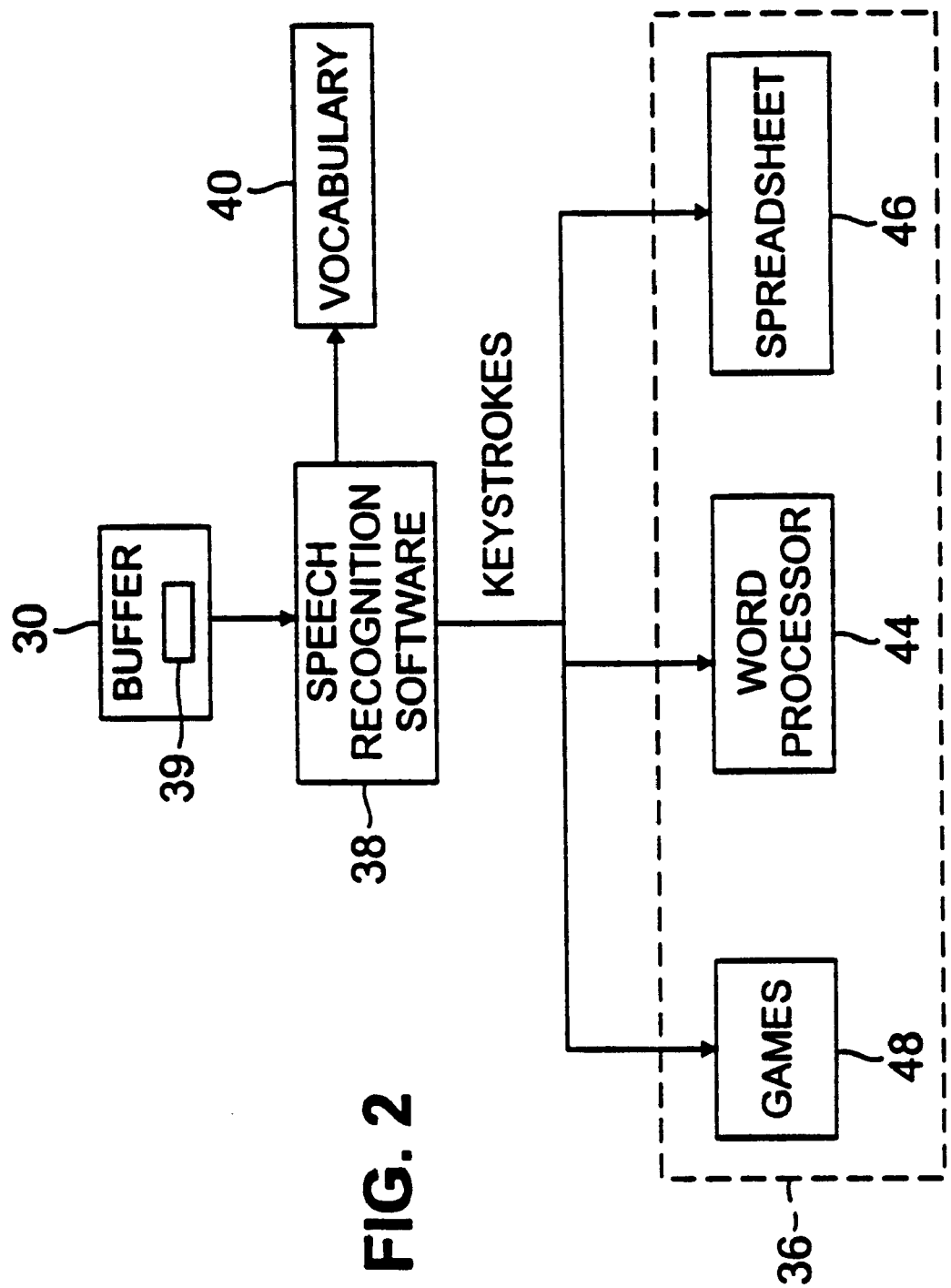
FIG. 2 is a block diagram of a speech recognition software and application software.

Referring to FIG. 2, to determine what words have been spoken speech recognition software 38 causes the CPU to retrieve speech frames within speech packet 39 from buffer and compare the speech frames to speech models stored in one or more vocabularies 40. For a more detailed description of continuous speech recognition, see U.S. Pat. No. 5,202, 952, entitled "Large-Vocabulary Continuous Speech Prefiltering and Processing System", which is incorporated by reference.

The recognition software uses common script language interpreter software to communicate with the application 36 that called the recognition software. The common script language interpreter software enables the user to dictate directly to the application either by emulating the computer keyboard and converting the recognition results into application dependent keystrokes or by sending application dependent commands directly to the application using the system's application communication mechanism (e.g., Microsoft Windows™ uses Dynamic Data Exchange™). The desired applications include, for example, word processors 44 (e.g., Word Perfect™ or Microsoft Word™), spreadsheets 46 (e.g., Lotus 1-2-3™ or Excel™), and games 48 (e.g., Solitaire™).

As an alternative to dictating directly to an application, the user dictates text to a speech recognizer window, and after dictating a document, the user transfers the document (manually or automatically) to the application.

Figure 3:
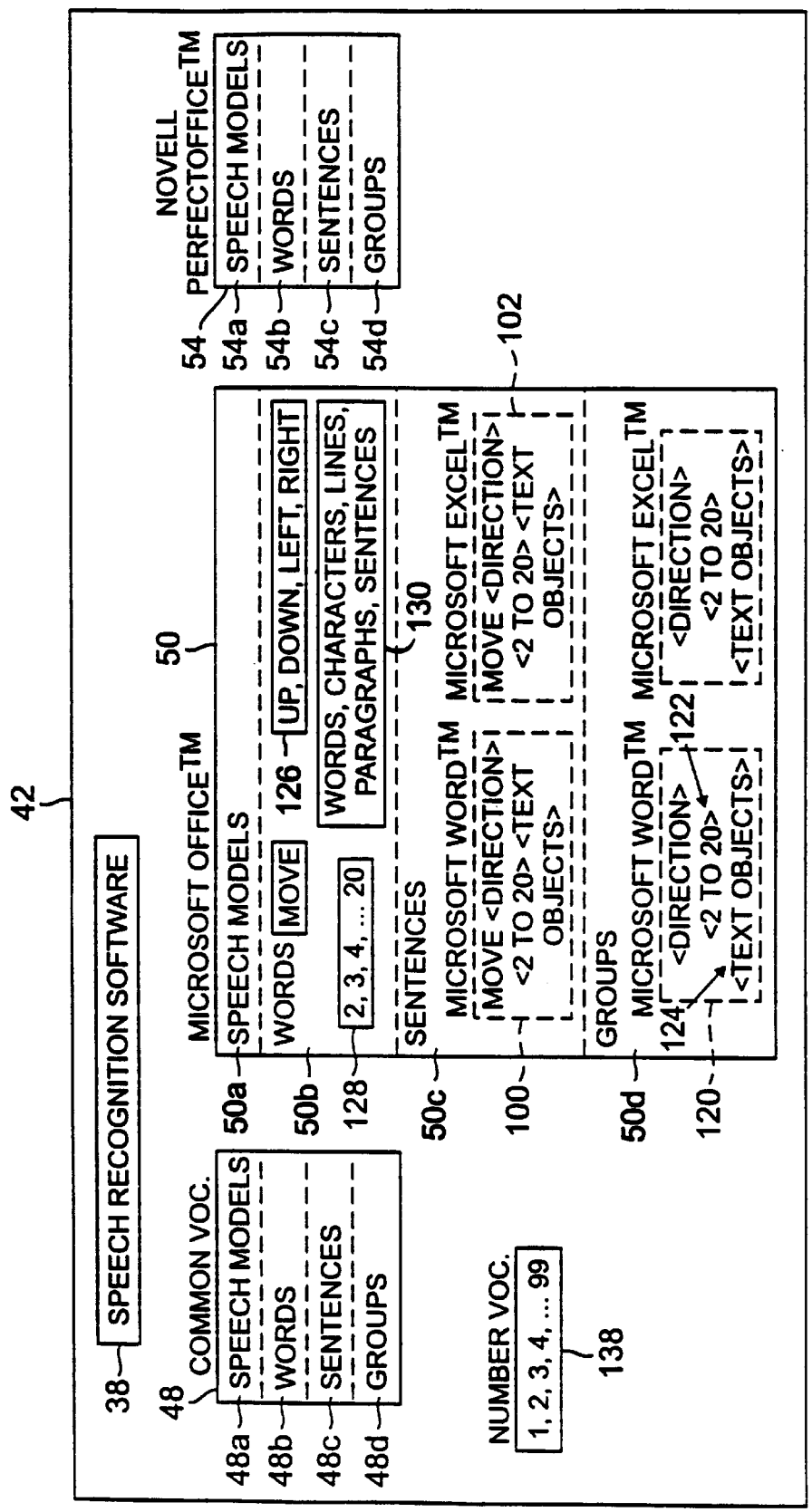
FIG. 3 is a block diagram of a speech recognition software and vocabulary stored in memory.

Referring to FIG. 3, when an application first calls the speech recognition software, it is loaded from a disk drive into the computer's local memory 42. One or more vocabularies, for example, common vocabulary 48 and Microsoft Office™ vocabulary 50, are also loaded from remote storage into memory 42. The vocabularies 48, 52, and 54 include all the words 48*b*, 50*b*, and 54*b* (text and commands), and corresponding speech models 48*a*, 50*a*, and 54*a*, that a user may speak.

Spreading the speech models and words across different vocabularies allows the speech models and words to be grouped into vendor (e.g., Microsoft™ and Novell™) dependent vocabularies which are only loaded into memory when an application corresponding to a particular vendor is executed for the first time after power-up. For example, many of the speech models and words in the Novell PerfectOffice™ vocabulary 54 represent words only spoken when a user is executing a Novell Perfectoffice™ application, e.g., WordPerfect™. As a result, these speech models and words are only needed when the user executes a Novell™ application. To avoid wasting valuable memory the Novell PerfectOffice™ vocabulary 54 is only loaded into memory when needed (i.e., when the user executes a Novell™ application).

Alternatively, the speech models and words may be grouped into application dependent vocabularies. For example, separate vocabularies may exist for Microsoft Word™, Microsoft Excel™, and Novell WordPerfect™. As another alternative, only a single vocabulary including all words, and corresponding speech models, that a user may speak is loaded into local memory and used by the speech recognition software to recognize a user's speech.

Figure 4:
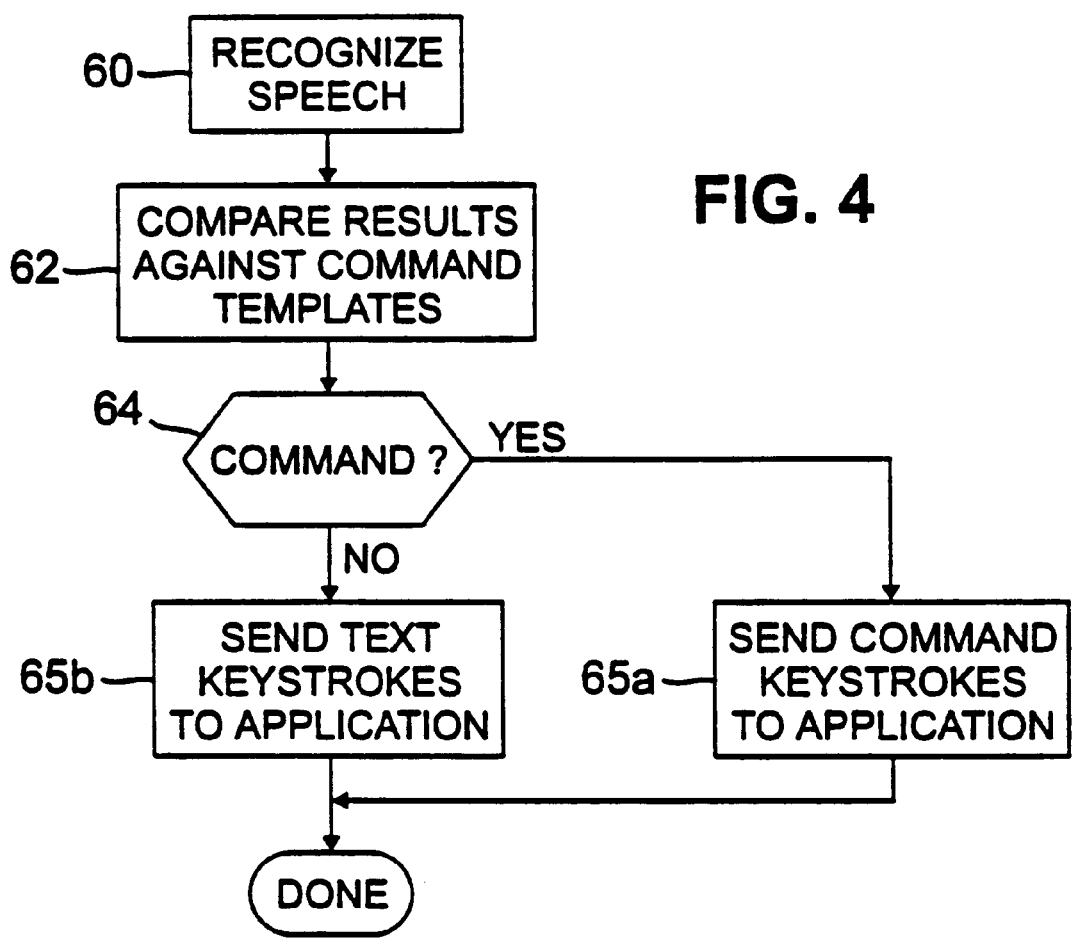
FIG. 4 is a flow chart of recognizing both commands and dictated text.

Referring to FIG. 4, once the vocabularies are stored in local memory an application calls the recognition software, in one method, the CPU compares speech frames representing the user's speech to speech models in the vocabularies to recognize (step 60) the user's speech. The CPU then determines (steps 62 and 64) whether the results represent a command or text. Commands include single words and phrases and sentences that are defined by templates (i.e., restriction rules). The templates define the words that may be said within command sentences and the order in which the words are spoken. The CPU compares (step 62) the recognition results to the possible command words and phrases and to command templates, and if the results match a command word or phrase or a command template (step 64), then the CPU sends (step 65*a*) the application that called the speech recognition software keystrokes or scripting language that cause the application to execute the command, and if the results do not match a command word or phrase or a command template, the CPU sends (step 65*b*)

the application keystrokes or scripting language that cause the application to type the results as text.

Figure 5:
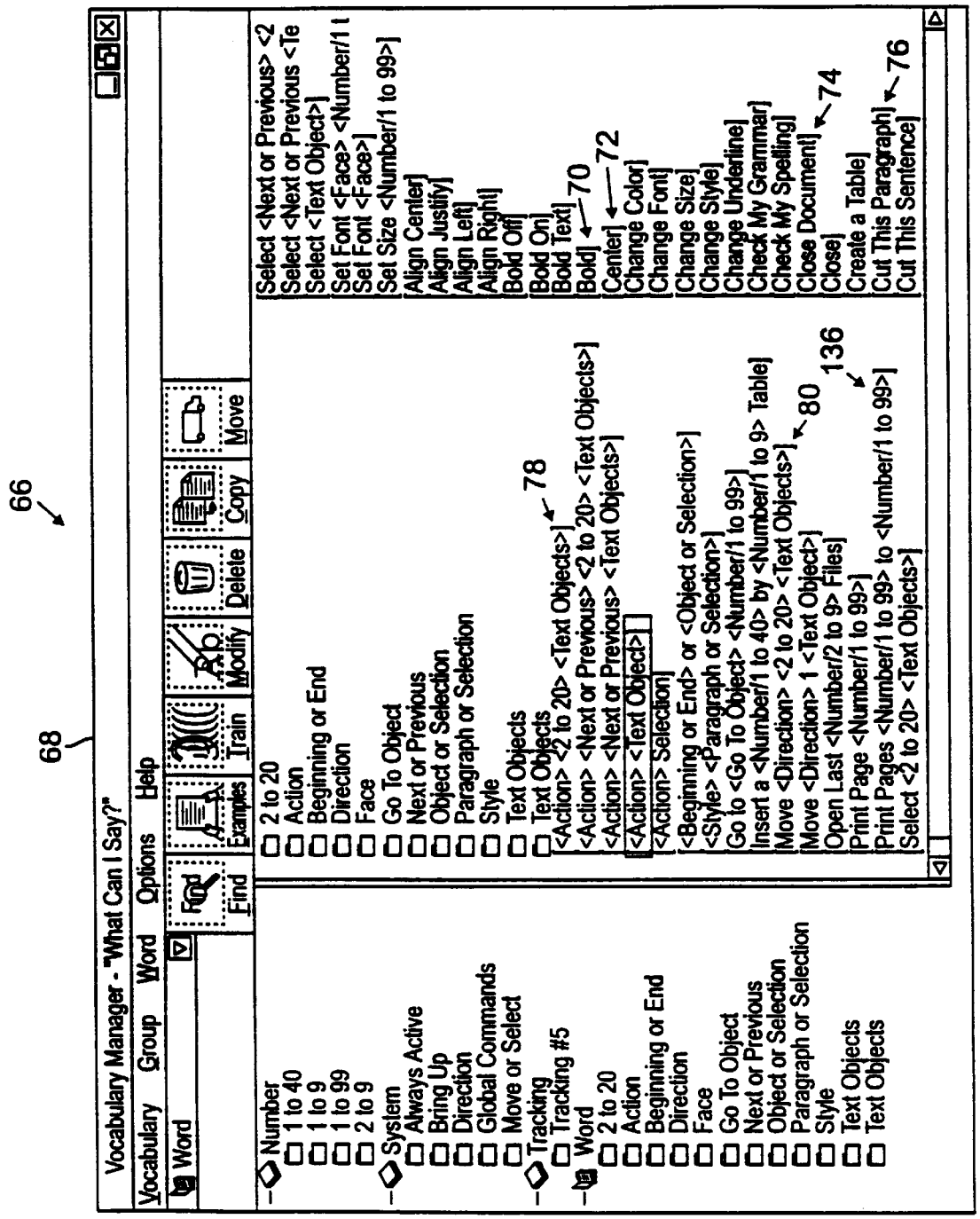
FIG. 5 is a computer screen display of word processing commands.
Figure 6:
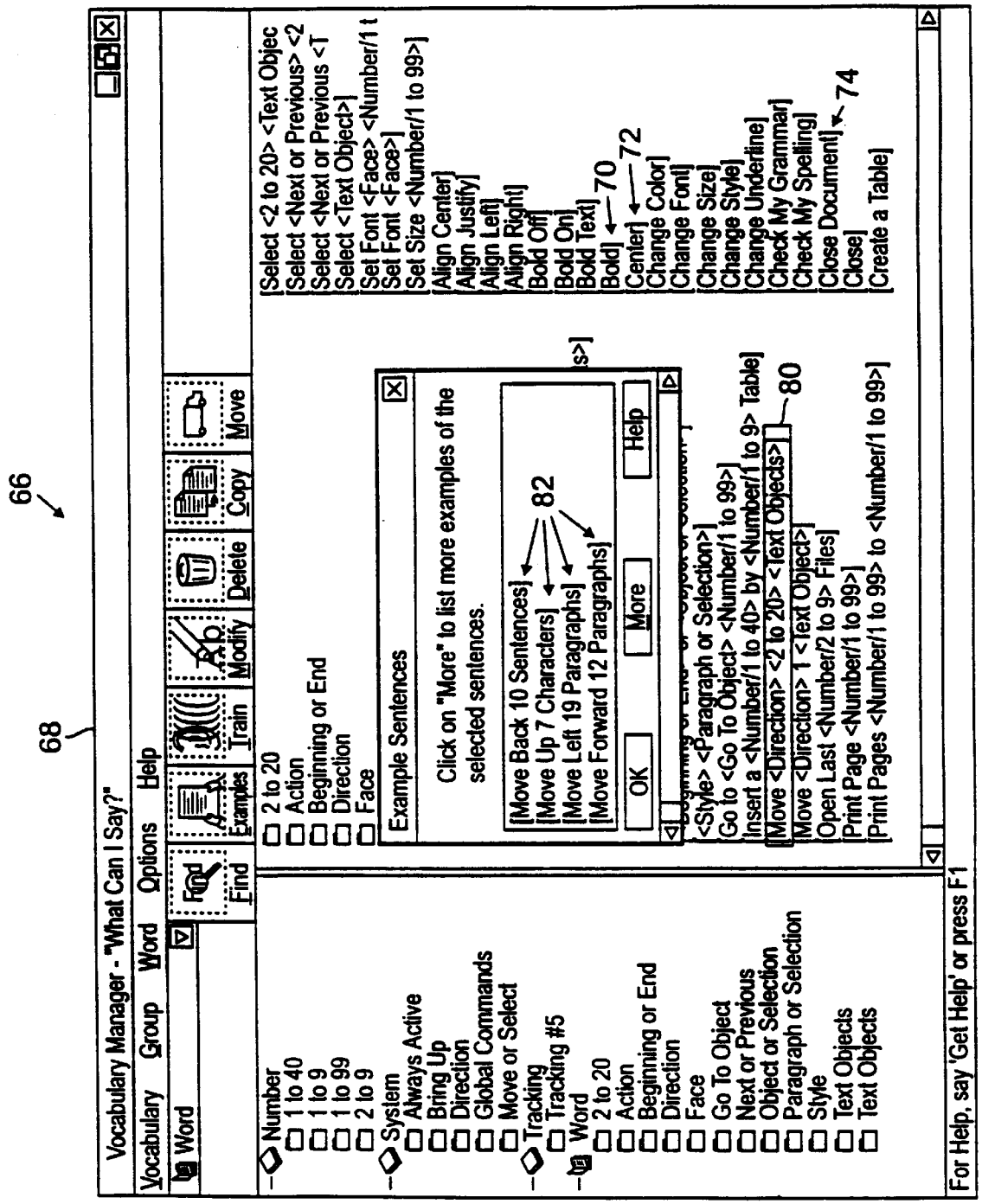
FIG. 6 is a computer screen display of examples of word processing commands.

Referring to FIG. 5, while dictating text, the user may cause the computer to display a command browser 66 by keystroke, mouse selection, or utterance (e.g., speaking the phrase "What Can I Say" 68 into the microphone). The command browser displays possible commands for the application being executed. For example, a word processing application includes single command words, e.g., [Bold] 70 and [Center] 72, command phrases, e.g., [Close Document] 74 and [Cut This Paragraph] 76, and flexible sentence commands, e.g., [<Action><2 to 20><Text Objects>] 78 and [Move <Direction><2 to 20><Text Objects>] 80. Referring also to FIG. 6, the user may select a command shown in the command browser to display examples 82 of the selected command 80.

Figure 7:
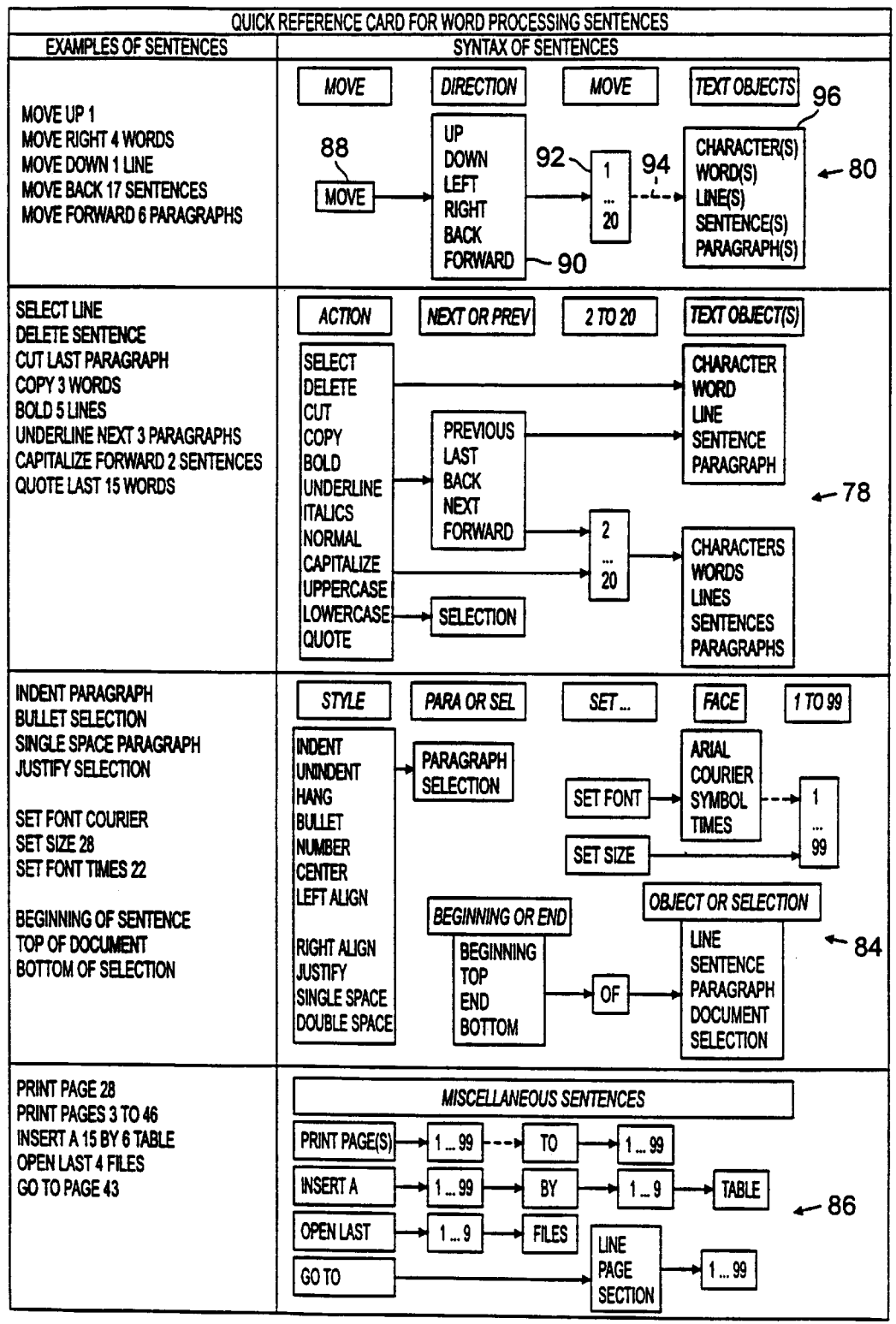
FIG. 7 is a block diagram of word processing commands.
Figure 8A:
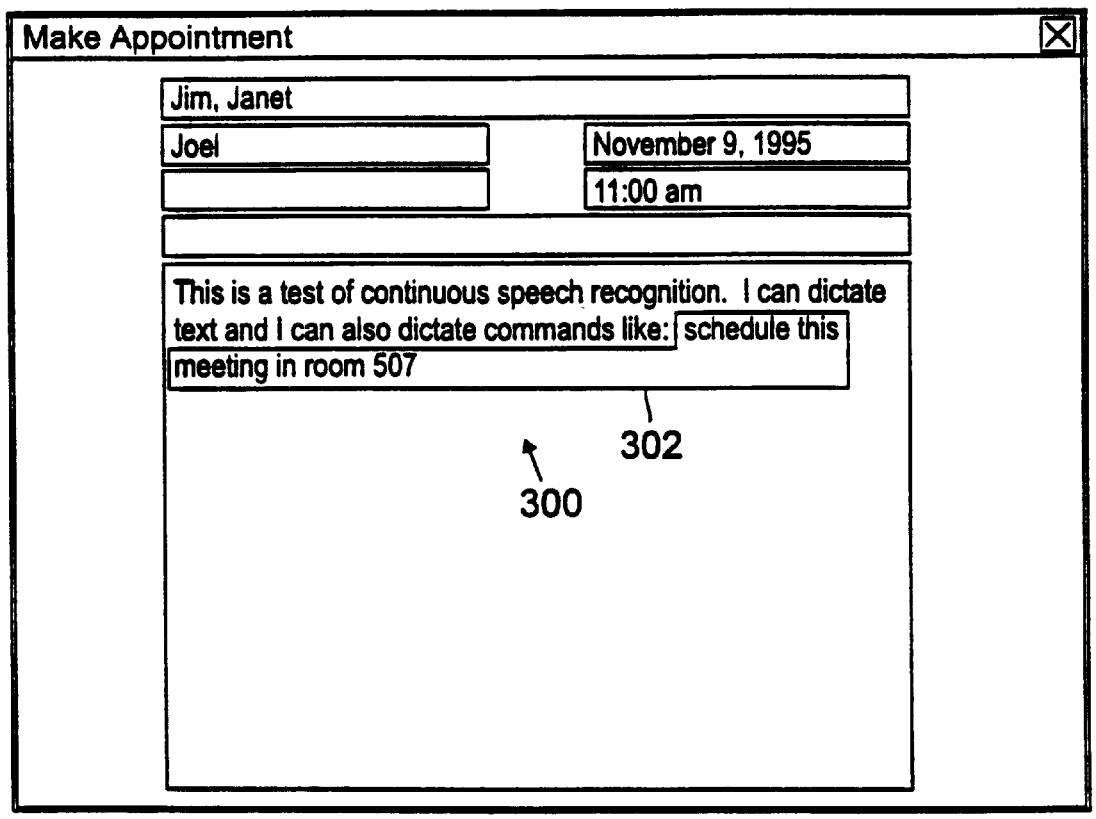
Figure 8B:
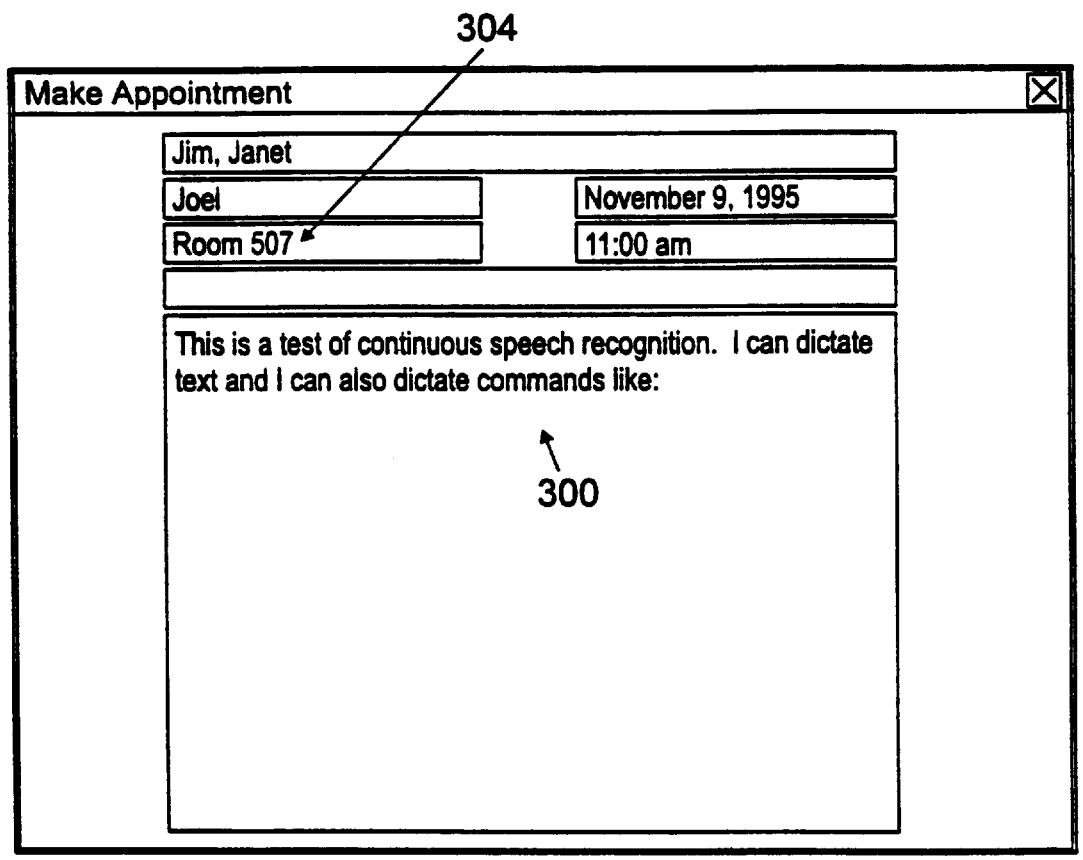
Figure 9A:
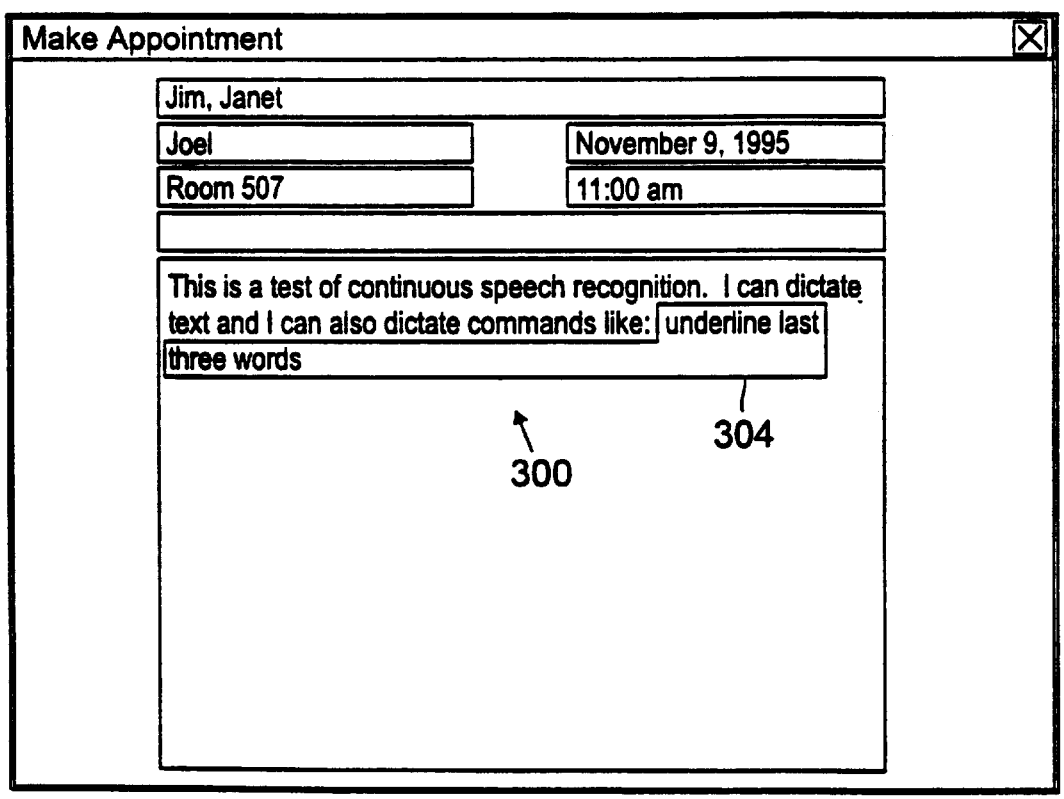
Figure 9B:
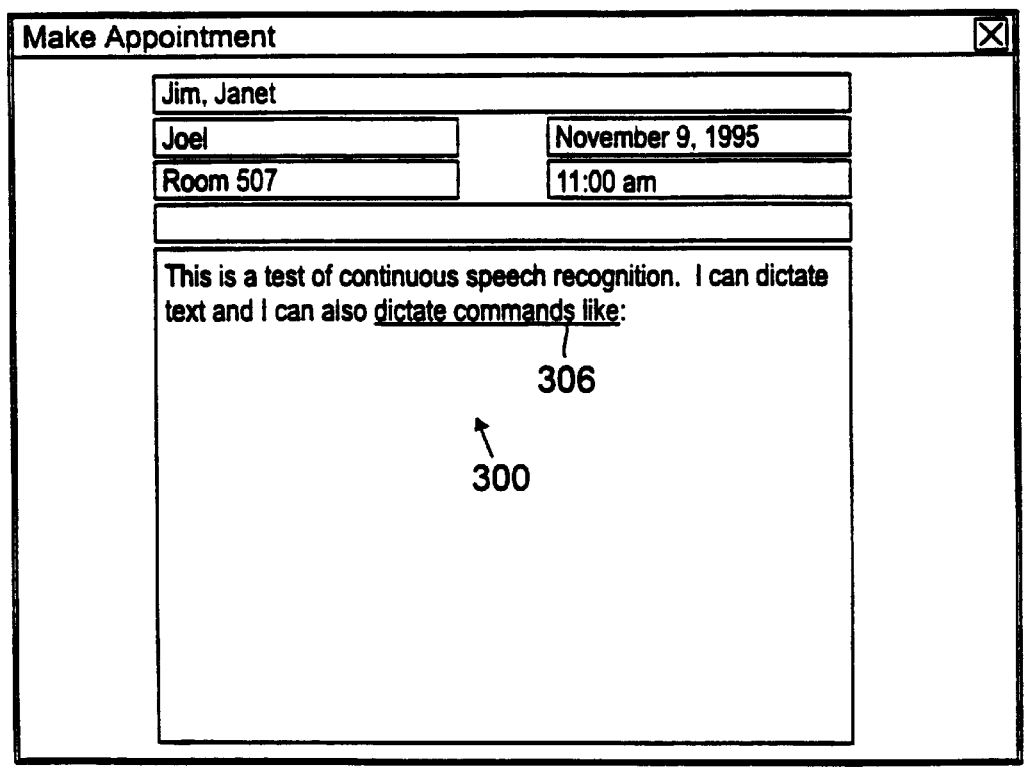

Referring to FIG. 7, the command sentences, e.g., 78, 80, 84, and 88, are spoken in accordance with a template and without long, e.g., greater than 0.5 second, pauses between the words of the sentence. (The length of the pause may be adjusted to compensate for a particular user's speech impediment.) For example, command 80 requires the user to speak the fixed word "Move" 88 followed by a direction variable 90 (i.e., <Direction>: "Up", "Down", "Left", f"Right", "Back", or "Forward"), a number variable 92 (i.e., <2 to 20>: "2", "3", "4", . . . or "120"), and, optionally (dashed line 94), a plural text object variable 96 (i.e., <Text Objects>: "Characters", "Words", "Lines", "Sentences", or "Paragraphs"). If the user wants to move up two lines in previously dictated text, the user says "Move Up 2 Lines". The user may not say "Move Up 2", "Please Move Up 2 Lines", or "Move Up Last 2 Lines"because this speech does not follow the template for Move command 80.

Referring back to FIG. 3, in addition to including words (and phrases) and corresponding speech models, the vocabularies include application (e.g., Microsoft Word™ 100 and Microsoft Excel™ 102) dependent command sentences 48c, 50c, and 54c available to the user and application dependent groups 48d, 50d, and 54d which are pointed to by the sentences and which point to groups of variable words in the command templates.

Aside from pointing to groups of variable words, the groups define the application dependent keystrokes (or scripting language) for each word that may be spoken. For example, when the user speaks a command sentence beginning with "Capitalize" while executing Microsoft Word™, the action group points to the word "Capitalize" and provides the following keystrokes:

{Alt+O}et{Enter}.

When executing Novell WordPerfect™, the action group also points to the word "Capitalize" but provides the following keystrokes:

{Alt+e}vi{Right0}.

Each command sentence in the loaded vocabularies 48, 50, and 54 includes pointers to the different components of the sentence. For example, command sentence 102 includes a pointer to the fixed word Move 178 (and its corresponding speech model) and pointers to the groups, e.g., <Direction>120, <2 to 20> 122, and <Text Objects> 124. The groups include pointers to the words in the groups (and the corresponding speech models), e.g., direction words 126, numbers 128, and text object words 130.

The pointers allow components of each sentence to be spread across several stored vocabularies and shared by the sentences of different vocabularies. For example, the command sentence 136 ([Print Pages <Number/1 to 99> to <Number/1 to 99>], FIG. 5) is stored in both the Microsoft Offices vocabulary 50 (not shown) and the Novell PerfectOffice™ vocabulary 54 (not shown), while the speech models and words (i.e., numbers 1 to 99) are stored in Number vocabulary 138. To allow for "cross-vocabulary recognition", the pointers in vocabularies 48, 50, and 54 reference by name the vocabulary in which the words can be found. For example, the variable words 1, 2, 3, . . . 99 may be found in the Number vocabulary (e.g., <Number/1 to 99>). Once the vocabularies are copied into local memory, the named references are resolved and replaced with actual address locations of the words within the local memory.

Through cross-vocabulary recognition, a word may be added to a variable group of words (e.g., <1 to 99>) in only one vocabulary instead of to each vocabulary including the group. Additionally, the variable group of words is not repeated across several vocabularies.

While a user's speech is being recognized, the CPU sends keystrokes or scripting language to the application to cause the application to display partial results (i.e., recognized words within an utterance before the entire utterance has been considered) within the document being displayed on the display screen (or in a status window on the display screen). If the CPU determines that the user's speech is text and the partial results match the final results, then the CPU is finished. However, if the CPU determines that the user's speech is text but that the partial results do not match the final results, then the CPU sends keystrokes or scripting language to the application to correct the displayed text. Similarly, if the CPU determines that the user's speech was a command, then the CPU sends keystrokes or scripting language to the application to cause the application to delete the partial results from the screen and execute the command.

For example, the application being executed by the system is a meeting scheduler (FIGS. 8a, 8b, 9a, and 9b). After the system displays partial results 302 "schedule this meeting in room 507" (FIG. 8a), the system determines that the utterance was a command and removes the text from the display screen (FIG. 8b) and executes the command by scheduling 304 the meeting in room 507. Similarly, after the system displays partial results 304 "underline last three words" (FIG. 9a), the system determines that the utterance was a command and removes the text from the display screen (FIG. 9b) and executes the command by underlining 306 the last three words.

The partial results allow the user to see how the recognition is proceeding. If the speech recognition is not accurate the user can stop speaking and proceed by speaking more slowly or clearly or the user or a technician can use the partial results information to diagnose speech recognition system errors.

One difficulty with recognizing both commands and text against the same set (i.e., one or more) of vocabularies is that language modeling information in the vocabularies may cause the CPU to recognize a user's spoken command as text rather than as a command. Typically, the speech models for dictated words include language modeling information about the way a user naturally speaks a given language. For example, the word "bold" is generally followed by a noun, e.g., "That was a bold presentation." On the other hand, command sentences are purposefully stilted or unnatural (e.g., beginning with action verbs instead of nouns) to distinguish them from text and improve speech recognition accuracy. For example, the command "bold" is generally followed by a direction (e.g., next, last), a number (e.g., 2, 3, 4), or a text object (e.g., character, paragraph), e.g., "Bold last paragraph." When a user's speech is recognized for commands and text against the same set of vocabularies, any language modeling information in the vocabularies tends to cause the system to favor the recognition of text over commands.

Referring to FIGS. 10 and 11, one alternative is to execute two serial recognitions. The CPU begins by recognizing (step 140, FIG. 10) the user's speech using one or more dictated word vocabularies 150 (FIG. 11) including words (and corresponding speech models) that a user may say while dictating text. This vocabulary includes language modeling information but not command sentences. The CPU then recognizes (step 142) the user's speech using one or more command vocabularies 152 including only command words, phrases, and sentences (and corresponding speech models and groups). Each recognition (steps 140 and 142) assigns a score to each recognition based on how closely the user's speech matches the speech models corresponding to the word or words recognized. The scores of both recognitions are then compared and the CPU determines (step 144) whether the user's speech was a command or text.

For command recognition, the CPU compares the initial speech frames to only a first group of possible speech models representing the first words of commands and does not compare the initial speech frames to every speech model in the command vocabularies. As an example, the initial speech frames are not compared to the direction variables, "Up", "Down", "Left", "Right", "Back", and "Forward." Limiting the number of speech models to which the speech frames are compared reduces the time for the comparison and increases the accuracy of the command recognition.

Referring also to FIG. 12, for continuous speech recognition, the recognizer engine begins in state 1 and waits 200 until the user begins speaking. As the user begins to speak, the CPU recognizes the beginning of the user's first word and pre-filters the first group of speech models for those speech models having similar sounding beginnings, e.g., "Select", "Center", "Single Space", "Set Font", "Set Size." The pre-filtered speech models provide a possible command sentence list of, for example, twenty, possible command sentences that the user may be speaking.

The recognizer continues by comparing the successive speech frames to the pre-filtered speech models but not to other speech models (e.g., "Bold"). The possible command list is ranked in the order of highest to lowest probability with the command including the speech model most closely matching the speech frames being of highest probability (best candidate). As the CPU continues to compare successive speech frames to the pre-filtered speech models, the CPU actively re-ranks the command list if the probabilities change.

If the CPU determines that the speech frames substantially match speech models for one or more first words in one or more commands, the CPU uses the pointer in each command to the next command component (i.e., second word) to begin comparing the successive speech frames to groups of speech models representing possible second words. For example, if the speech recognition engine recognizes the word Copy 202 as one of the twenty possible first words spoken, then the speech recognizer engine uses the references in the <Action>command sentences 78 (FIG. 7) to begin comparing (state 2) the successive speech frames to the speech models representing the words in the <Next or Previous>group 204, including, "Previous", "Last", "Back", "Next", and "Forward", the fixed word "Selection"206, the <2 to 20> group 208, and the <Text Objects> group 210. The speech recognizer may also identify the beginning of the second word to pre-filter the speech models representing possible second command sentence words.

Because some words take longer to speak than others, the speech recognition engine simultaneously continues to compare the successive speech frames to longer pre-filtered speech models. Thus, as the speech recognizer compares (state 2) the successive speech frames to groups of speech models representing possible second words in the command sentences starting with the word "Copy", the speech recognizer continues to compare the successive speech models to longer speech models representing the words "Capitalize" 212 and "Quote" 214. The continued comparison may cause the CPU to list one of these other possibilities as a higher probability than "Copy" 202 followed by a second command sentence word.

The command sentences are similar in grammar and limited in number to reduce the amount of user confusion and to permit the user to easily memorize the possible commands. The variables (e.g., <Action>, <Style>, <Next or Prev>) in the command sentences provide the user with a wide variety of commands without introducing a large number of individual command sentences.

Additional command sentences may be generated for other types of applications. For example, FIG. 13 displays possible command sentences for spreadsheet applications (e.g., Lotus 1-2-3™ and Excel™). The command sentence templates are generic across spreadsheet applications. However the keystrokes from the command recognizer software to the application are application dependent (i.e., the keystrokes required by Lotus 1-2-3™ may be different from the keystrokes required by Excel™).

The CPU favors dictated text over similarly scored commands because it is easier for the user to delete misrecognized commands that are typed into a document than it is for a user to undo text that is misrecognized and executed as a command. For example, if the user dictates "belated fall flies," and the system recognizes the text "belated fall flies" and the command "delete all files", it is easier for the user to delete the typed command "delete all files" than it is for the user to regain all deleted files.

In favoring text, the system first determines if there was a command reject. Command rejects include noise picked up by the system microphone. The speech frames may be identified as noise if they match speech models corresponding to background noise, telephone ringing, or other common noises, or the user utterance may be considered a command reject if the command recognition scores below an empirically tuned threshold. The user may be given the ability to vary the threshold to provide the user with some control over the precision of spoken commands. Other command rejects include insufficient volume or excessive volume, hardware errors, or buffer overflow errors. Several command rejects may also be considered text rejects as well.

In favoring text, the system next determines if the user's speech conformed to a command template. User's speech that does not conform to a command template does not provide a valid recognized command. A user's speech does not conform to a template if the user does not speak permitted words in the predetermined order or if the user inserts pauses between the words of a command. For example, if the user says "bold last 3 (pause) words", the words "bold last 3" are considered one utterance while the word "words" is considered another utterance. Neither utterance conforms to a command template, and, thus, neither utterance provides a valid recognized command result.

The system also favors text by comparing the recognition score of the command against the recognition score of the text. If the text score is higher, then the system recognizes the user's speech as text. If the text and command scores are equal or the command score is within an empirically tuned range of the text score, then the system favors text by recognizing the user's speech as text. For example, the empirically tuned range may be determined by multiplying the number of words in the utterance by an empirically determined number, e.g., 100. However, because the commands are stilted or unnatural, the recognition score of a correctly spoken command will generally greatly out score the text recognition.

Dictated text is not favored where the user cannot be dictating text. For instance, if the user has pulled down a window menu, then a user's spoken utterance can only be a command and thus, command recognition is favored or only command recognition is executed.

If the CPU determines that the user's speech is text, the CPU sends (step 146) keystrokes or scripting language representing the recognized words to the application that called the speech recognition software. If the CPU determines that the user's speech is a command, the CPU sends (step 148) keystrokes or scripting language commands to the application to cause the application to execute the command.

Recognizing dictated text takes longer (e.g., 1.2 real time) than the recognizing commands (e.g., 0.1 real time). One reason for the increase in time is that the dictated text vocabulary is much larger than the command vocabulary. Recognizing the dictated text before recognizing commands takes advantage of the speaking time required by the user.

Because the dictated text and command vocabularies are separate, they may be optimized for their respective purposes without reducing the accuracy of either recognition. As discussed, the dictated text vocabulary may include language modeling information. Similarly, the command vocabulary may include modeling information that optimizes command recognition. For instance, the word "sentence" may have a higher probability (i.e., receive a higher score) than the word "character".

Another alternative is parallel speech recognition of both dictated text and commands. Referring to FIG. 14, the CPU simultaneously recognizes (steps 160 and 162) dictated text and commands by simultaneously comparing the speech frames of the user utterance against one or more dictated text vocabularies 150 and one or more command vocabularies 152. The CPU then compares (step 164) the results of both recognitions and determines (step 166) if the user utterance is a command or text. Again, the CPU favors text recognition over command recognition. If the CPU determines that the user utterance is a command, then the CPU sends (step 168) keystrokes or scripting language to the application that called the speech recognition software to cause the application to execute the recognized command. If the CPU determines that the user utterance is dictated text, then the CPU sends (step 170) keystrokes or scripting language to the application to cause the application to type the recognized text.

If the first word of a user utterance is recognized as a first word of a command sentence, then the CPU may stop the dictated text recognition and complete only the command recognition. Similarly, if the first word of a user utterance is not recognized as a first word of a command sentence, then the CPU may stop the command recognition and complete only the dictated text recognition. Additional speech recognition optimizations and optimizations for distinguishing text from commands are also possible.

COMMAND CORRECTION

Figure 15A:
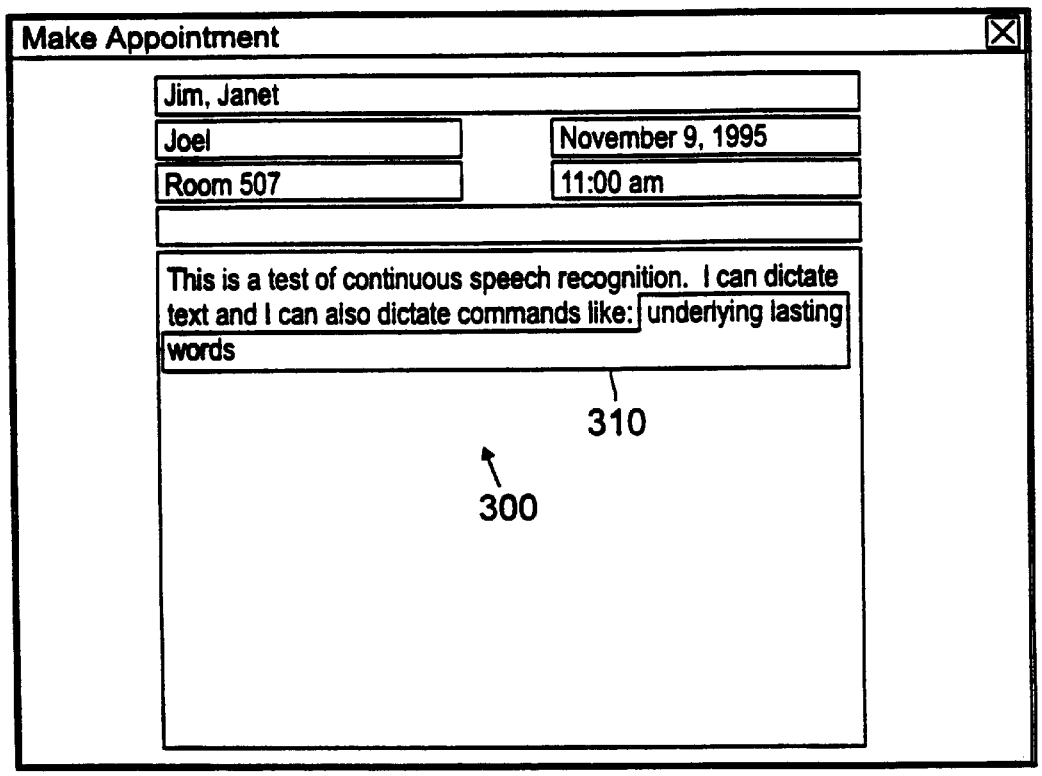
Figure 15B:
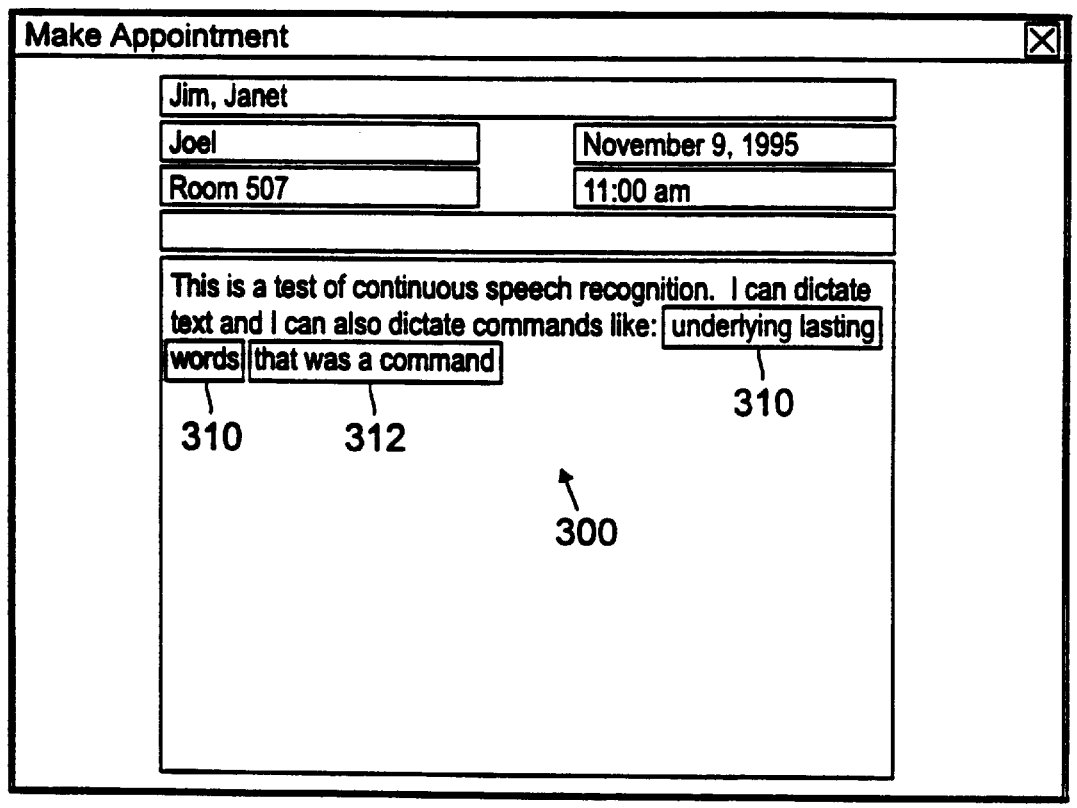
Figure 15C:
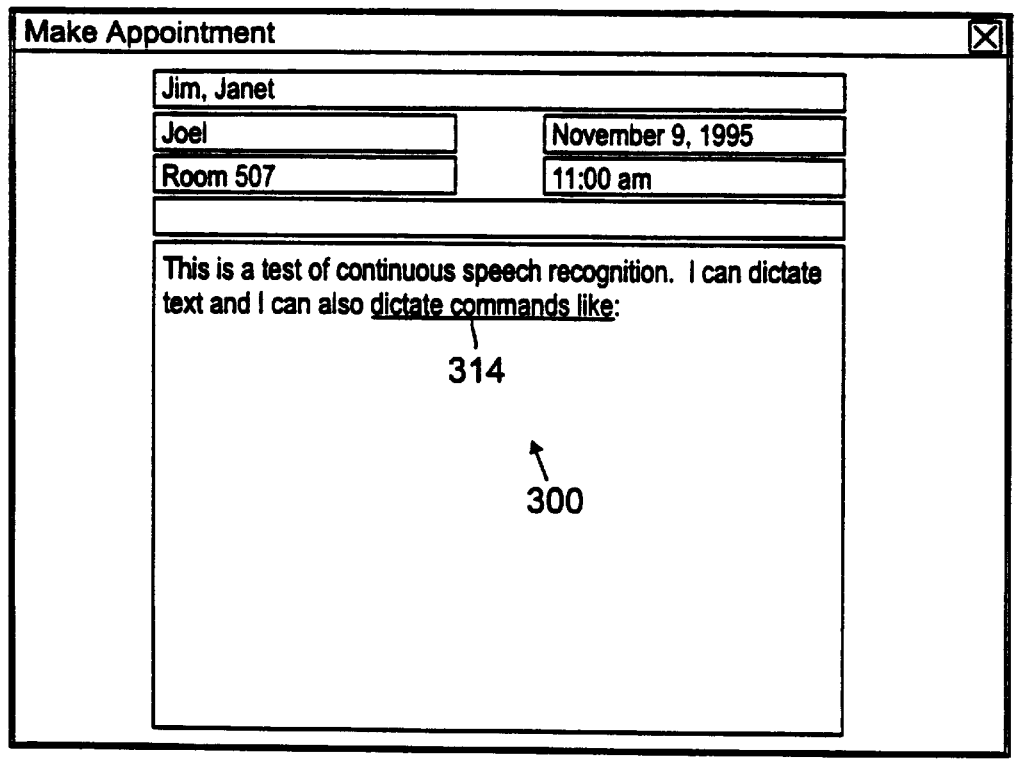

Referring to FIGS. 15a–15c, if the speech recognition system incorrectly recognizes a spoken command 310 as dictated text, the user may cause (by keystroke, mouse selection, or spoken command, e.g., "That was a command" 312, FIG. 15b) the CPU to re-execute the speech recognition software. The CPU then re-recognizes the user's previous utterance and generates keystrokes or scripting language commands to cause the application that called the speech recognition software to delete the previously typed text (FIG. 15c). Where a separate command vocabulary is available, the re-recognition is executed only against this vocabulary to increase the likelihood that the spoken command is correctly recognized. If the re-recognition provides a command result with a score that exceeds the empirically tuned threshold then the CPU generates keystrokes or scripting language commands that cause the application to execute the command (e.g., underlined text 314, FIG. 15c).

Figure 15D:
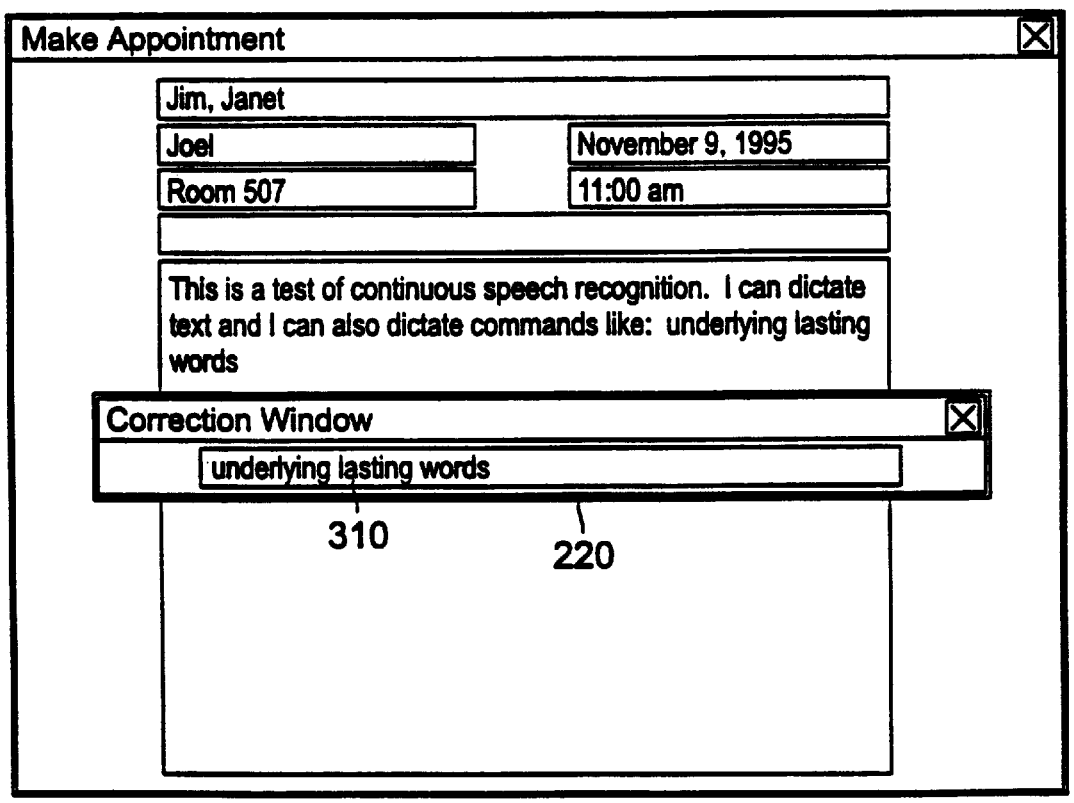

Referring to FIG. 15d, if the re-recognition does not provide a command result or the score of the command result is insufficient, then the CPU displays the rerecognized text 310 within a command window 220 on the system's display screen. Alternatively, the command window is displayed each time the user selects re-recognition or, for each selection of re-recognition, the user determines when the command window is displayed. As previously described, there are many reasons why a command may be incorrectly recognized. For example, if the user does not speak a command in accordance with a command template, then the CPU cannot recognize the user's speech as a command. Similarly, if the user's environment is especially noisy or the user speaks too quickly or unclearly, then the CPU may not recognize the user's speech as a command. Displaying the re-recognized speech to the user allows the user to detect their own mistakes as well as environmental problems. This information may also be used to diagnose system problems.

Recognition of a "dangerous" (i.e., difficult to undo) command may also cause the CPU to display the rerecognized command within the command window. For example, if the CPU recognizes the command "Delete all files", before executing this "dangerous" command, the CPU displays the command for the user. The CPU may also display low scoring commands for the user. If the user agrees that the displayed command in the command window is the command the user wants to execute, then the user requests (by keystroke, mouse selection, or utterance "OK") the execution of the command. If the user does not agree with the displayed command or the displayed text does not match a valid command, then the user may edit the previously spoken command, for example, by typing the correct command in the command window or by saying "Edit" followed again by the intended spoken command. The system then executes and recognized valid commands or again displays any recognized speech that does not conform to a command template.

To avoid misrecognizing commands, the user may notify the system ahead of time that the user is going to speak a command. For example, the user may say "Simon Says" (or another unusual phrase) before speaking a command or hold in the control key when speaking a command. When the system recognizes "Simon Says" it does not type it as text but uses it as a notification that the next utterance is or the following words in the same utterance are a command. The command notification may be used to prevent the CPU from choosing recognized dictated text as the result or to compare the utterance only to a command vocabulary (where available) to further improve speech recognition accuracy. Providing a command notification is particularly useful when the user is going to speak a command that the system regularly misrecognizes as text. For other easily recognized commands, the user may choose not to provide the notification.

Instead of notifying the system that the user is going to speak a command, the system may be notified that the user is going to dictate text.

Additionally, if the speech recognition system incorrectly recognizes dictated text as a command, the user may cause (by keystroke, mouse selection, or spoken command, e.g., "Type That") the CPU to re-execute the speech recognition software.

Other embodiments are within the scope of the following claims.

For example, instead of having a digital signal processor (DSP) process the samples corresponding to each speech frame to generate a group of parameters associated with the analog data signal during each 20 ms time period, the CPU includes front-end processing software that allows the CPU to generate the parameters.

What is claimed is:

1. A method for use in recognizing continuous speech comprising:

accepting signals corresponding to interspersed speech elements including text elements corresponding to text to be recognized and command elements corresponding to commands to be executed, wherein a particular one of the speech elements may correspond to a text element in one context and to a command element in another context, recognizing the speech elements as if they were text, after recognizing the speech elements as if they were text, recognizing the speech elements as if they were commands, and when a recognized one of the speech elements may be either a command element or a text element, designating the recognized speech element as corresponding to a text element or to a command element based on a context in which the recognized speech element appears.

2. The method of claim 1 in which a text element is acted on by providing the text element to a text processing application.

3. The method of claim 1 in which a command element is acted upon by causing an application to perform an action.

4. The method of claim 1 in which the designating is based on natural characteristics of spoken text versus spoken commands.

5. The method of claim 1 in which the designating includes evaluating a likelihood that the recognized speech element is either a command element or a text element.

6. The method of claim 1 further including biasing, the designating in favor of the recognized speech element being a text element or a command element.

7. The method of claim 6 in which the biasing includes determining if the recognized speech element reflects a command reject.

8. The method of claim 6 in which the biasing includes determining if the recognized speech element conforms to a command template.

9. The method of claim 6 in which the biasing includes comparing recognition scores of the recognized speech element as a command or as text.

10. The method of claim 6 in which the biasing includes determining the length of silence between successive ones of the speech elements.

11. The method of claim 6 in which the biasing includes determining whether actions of the user imply that the recognized speech element cannot be text.

12. A method for use in recognizing continuous speech, the method comprising:

accepting signals corresponding to interspersed speech elements including text elements corresponding to text to be recognized and command elements corresponding to commands to be executed, wherein a particular one of the speech elements may correspond to a text element in one context and to a command element in another context, recognizing the speech elements, when a recognized one of the speech elements may be either a command element or a text element, designating the recognized speech element as corresponding to a text element or to a command element based on a context in which the recognized speech element appears, and if the recognized speech element includes a command element, displaying information associated with the command element.

13. The method of claim 12 in which the displaying includes displaying a command element that would be difficult to undo after execution of the command.

14. A method for use in recognizing continuous speech, the method comprising:

accepting signals corresponding to interspersed speech elements including text elements corresponding to text to be recognized and command elements corresponding to commands to be executed, wherein a particular one of the speech elements may correspond to a text element in one context and to a command element in another context, enabling a user to indicate whether a speech element is a command element, recognizing the speech elements, and when a recognized one of the speech elements may be either a command element or a text element, designating the recognized speech element as corresponding to a text element or to a command element based on either a context in which the recognized speech element appears or the user indication.

15. A method for use in recognizing continuous speech, the method comprising:

accepting signals corresponding to interspersed speech elements including text elements corresponding to text to be recognized and command elements corresponding to commands to be executed, wherein a particular one of the speech elements may correspond to a text element in one context and to a command element in another context, enabling a user to indicate whether a speech element is a text element, recognizing the speech elements, and when a recognized one of the speech elements may be either a command element or a text element, designating the recognized speech element as corresponding to a text element or to a command element based on either a context in which the recognized speech element appears or the user indication.

* * * * *